United States Patent
Mruk

(10) Patent No.: US 8,840,147 B2
(45) Date of Patent: Sep. 23, 2014

(54) TELEMETRY SYSTEM ADAPTATION FOR NON-TELEMETRY EQUIPPED SENSORS

(75) Inventor: Walter Mruk, Far Hills, NJ (US)

(73) Assignee: DataOnLine Intellectual Property, LP, New Providence, NJ (US)

( * ) Notice: Subject to any disclaimer, the term of this patent is extended or adjusted under 35 U.S.C. 154(b) by 325 days.

(21) Appl. No.: 13/088,584

(22) Filed: Apr. 18, 2011

(65) Prior Publication Data

US 2011/0255913 A1  Oct. 20, 2011

Related U.S. Application Data

(60) Provisional application No. 61/325,433, filed on Apr. 19, 2010.

(51) Int. Cl.
*F16L 11/118* (2006.01)
*F16B 5/02* (2006.01)

(52) U.S. Cl.
CPC .................................. *F16B 5/0275* (2013.01)
USPC ............................ 285/149.1; 285/90; 29/593

(58) Field of Classification Search
USPC .......... 285/149.1, 154.1, 150.1, 151.1, 153.1, 285/90; 29/593
See application file for complete search history.

(56) References Cited

U.S. PATENT DOCUMENTS

| | | | | |
|---|---|---|---|---|
| 2,862,040 | A * | 11/1958 | Curran | 285/151.1 |
| 3,104,120 | A * | 9/1963 | Ahlport et al. | 285/154.1 |
| 4,717,792 | A * | 1/1988 | Sterritt et al. | 285/151.1 |
| 5,287,168 | A * | 2/1994 | Poucher et al. | 356/436 |
| 5,654,525 | A * | 8/1997 | Starozik | 285/154.1 |
| 5,789,920 | A * | 8/1998 | Gass | 324/260 |
| 6,339,468 | B1 * | 1/2002 | Clifford et al. | 356/4.01 |
| 6,395,158 | B1 * | 5/2002 | King et al. | 204/420 |
| 6,988,746 | B2 * | 1/2006 | Olson | 285/151.1 |
| 7,437,027 | B2 * | 10/2008 | Zerwekh et al. | 385/12 |
| 7,726,876 | B2 * | 6/2010 | Laverdiere et al. | 374/125 |
| 2004/0058451 | A1 * | 3/2004 | Pauli et al. | 436/163 |
| 2009/0065068 | A1 * | 3/2009 | McGill | 29/890.124 |

* cited by examiner

*Primary Examiner* — David E Bochna
(74) *Attorney, Agent, or Firm* — Zarley Law Firm, P.L.C.

(57) ABSTRACT

A coupling adaptor. The coupling adaptor includes a body which extends from a first end to a second end. The body also has a hollow interior extending between the first end and the second end. The first end has a first port with screw threads. The first threaded port mates with and receives an electronic sensor. The second end has a second threaded port with screw threads. The second threaded port mates with and receives a telemetry system.

11 Claims, 2 Drawing Sheets

TELEMETRY SYSTEM ADAPTATION FOR NON-TELEMETRY EQUIPPED SENSORS

CROSS REFERENCE TO RELATED APPLICATION

This application claims the benefit of U.S. Provisional Application No. 61/325,433 filed Apr. 19, 2011.

BACKGROUND OF THE INVENTION

This invention relates to sensors for monitoring materials in a container. More specifically, this invention relates to a telemetry system adaptation for non-telemetry equipped sensors for such in a container.

Electro-mechanical sensors have been used to locally monitor the level of container contents in industrial applications for some time. In more recent years these sensors have been coupled to remote monitoring systems that enable off site readings of the container or tank content level for the purposes of inventory management and reordering control. This method involves wiring a commercially available sensor to a commercially available remote monitoring system. This results in a multi-part interconnected system. There are installations of equipment in hazardous locations where the wiring of multiple components together (field wiring) is prohibited by codes.

In another prior art implementation the sensor and remote monitoring electronics may be combined by the manufacturer and the only option to replace the remote monitoring system part is to use replacement parts from that manufacturer rather than being able to add other commercially available systems as an alternate. Thus, a need exists for a method and the hardware to enable the replacement of the remote monitoring electronics package with that of a different manufacturer while precluding the use of field wiring to meet the applicable safety codes.

BRIEF SUMMARY OF THE INVENTION

A coupling adaptor includes a body which extends from a first end to a second end. The body also has a hollow interior extending between the first end and the second end. The first end has a first threaded port with screw threads. The first threaded port mates with and receives an electronic sensor. The second end has a second threaded port with screw threads. The second threaded port mates with and receives a telemetry system.

DESCRIPTION OF THE PREFERRED EMBODIMENT

Figure 1:
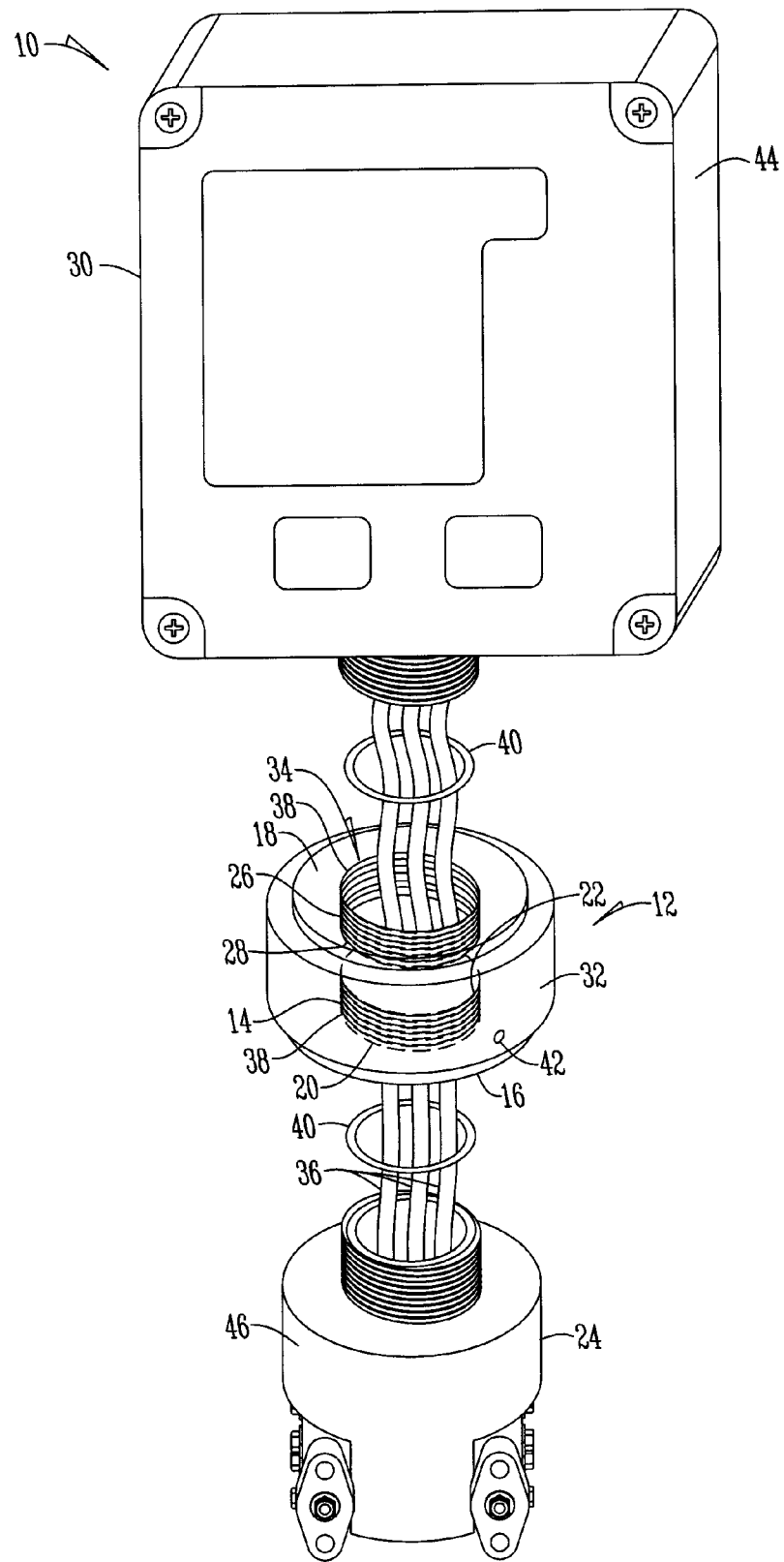
FIG. 1 is a partially exploded plan view of the adaptive system.
Figure 2:
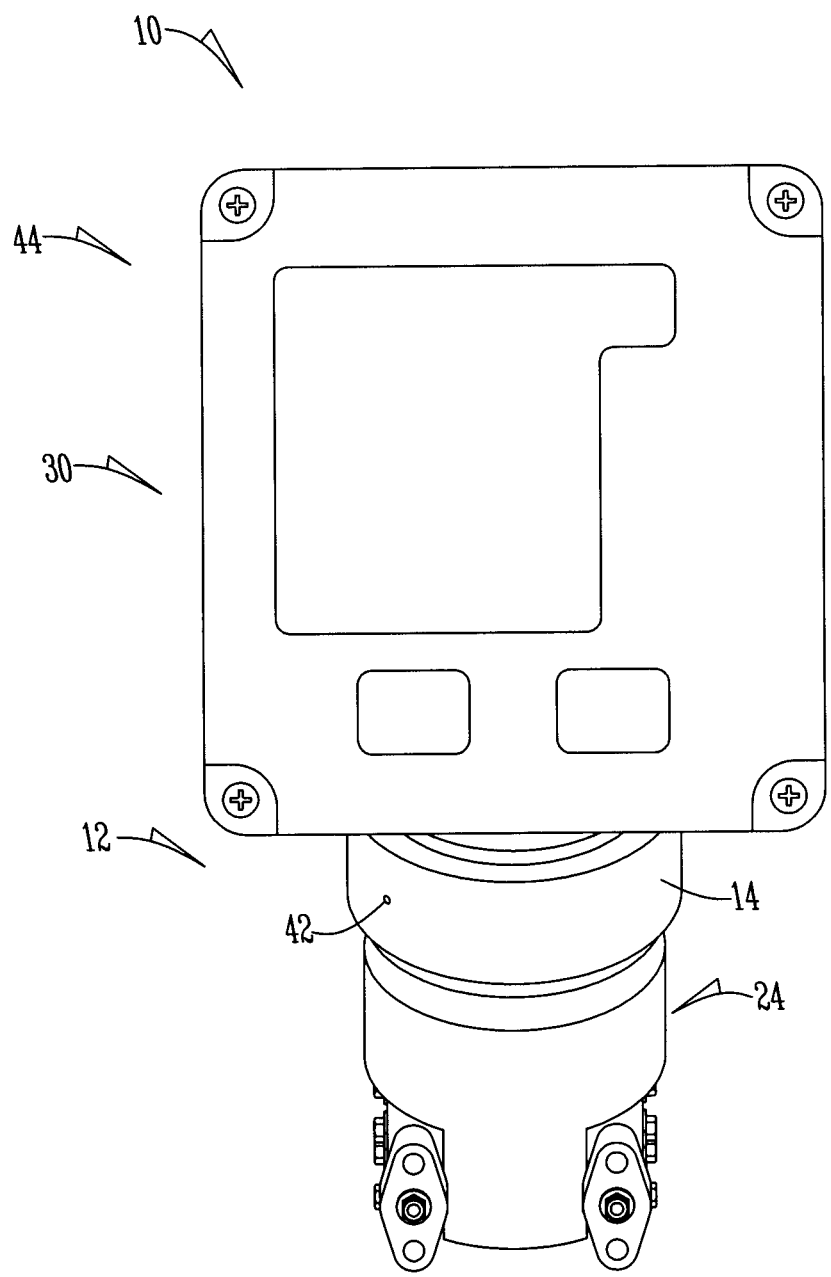
FIG. 2 is a plan view of the adaptive system.

The figures present an adaptive system 10 that includes a mechanical coupling 12. The mechanical coupling 12 includes a body 14 that at a first end 16 has a port 20 that includes screw threads 22 for mating with and receiving an electronic sensor 24 and extends to a second end 18 that has a second port 26 that in one embodiment includes screw threads 28 for mating with and receiving a remote monitoring system 30 such as a telemetry system such that when combined with a locking ring 32 the telemetry system 30 is secured to the mechanical coupling 12. One skilled in the art will appreciate that ports 20 or 26 can have either male or female threads, or have other means of connection without falling outside the scope of this application.

The interior 34 of the coupling 12 is hollow so that electronic components 36 such as wiring can be passed through the body 14 to electrically connect the sensor 24 and remote monitoring system 30. The coupling 12 also incorporates machine receptacles 38 for rubber O-ring seals 40 at the ports 20, 26 effecting an environmental sealed design which prevents water ingressed to the electrical components 36 located in the sensor 24 or remote monitoring system 30. The coupling 12 further incorporates multiple set screws 42 at the threaded sensor 24 interfaced to lock the component together securely.

In operation, the sensor 24 is secured to the first end 16 of the body 14 and is electrically connected to the electronic components 36 within the hollow body 34 of the coupling 12. A remote sensing system 30 is then secured to the second end 18 of the body 14 via the threads 28 and locking member 32 and providing electrical connection via the electronic components 36 in the body 14 to the sensor 24. In another embodiment, once the sensor 24 is secured to the first end 16 of the body 14, the sensor wiring 36 is passed through the coupling 12 and connected directly to the remote sensing system 30.

Thus, provided is a system 10 that provides for an electric coupling 12 between any type of sensor and remote monitoring system without presenting external wires. The coupling 12 can be machined in many different configurations to match commercially available electronic sensors and adapt them to any commercial remote monitoring systems such as telemetry systems resulting in a one-piece self contained remote sensing system 10. The invention discloses a method and the hardware to enable the connection of the components in a manner which precludes the use of field wiring and meets applicable safety codes. Thus, the end result is a one-piece remote monitoring sensor system 10 that contains no external wiring and meets standard electrical codes accordingly. In addition, the system allows for a simple replacement of defective monitoring electronics so that a new or more compatible remote monitoring system 30 or sensor 24 can be easily provided.

The invention consists of a mechanical coupling 12 that has the mating screw threads 22 for the body 44 of a commercially available electronic sensor 24 on one end 16 and the screw threads 28 and locking ring 32 that mate with a remote telemetry system 30 on the opposite end 18. The interior 34 of the coupling 12 is hollow to enable the passage of electrical wiring 36 between the sensor 24 and the remote monitoring system 30 without external wires. When the three pieces 12, 24, 30 of the system 10 are properly mated, the sensor 24, the coupling 12, and the monitoring electronics 30; a one-piece remote monitoring sensor system 10 results with no external wiring.

In another variation of the invention, the coupling 12 has the mating screw threads 22 for the sensor body 46 of a commercially available electronic monitoring sensor on one end 16 and the screw threads 28 and locking ring 32 that mate with a replacement remote telemetry system on the opposite end 18. This enables the user to remove the defective monitoring electronics and using the invented coupler 12 replace it with a replacement remote telemetry system of different and usually incompatible type.

The coupling 12 can be machined in many different configurations to match commercially available electronic sensors and adapt them to many commercially available remote monitoring systems resulting in a one-piece self contained remote sensing system 10. The coupling incorporates machined receptacles 38 for rubber O-Ring seals 40 at the ports 20, 26 affecting an environmentally sealed design which will prevent water ingress to the electrical components 36 located in the sensor 24 or remote monitoring system 30. The coupling 12 further incorporates multiple set screws 42 at the threaded sensor interface 20 to lock the components together securely.

What is claimed is:

1. A coupling adaptor comprising:
    a body having a hollow interior extending between a first end and a second end;
    the first end receiving an electronic sensor and providing an electrical connection to a plurality of electrical wires within the body;
    the second end receiving a remote sensing system to provide an electrical connection between the remote sensing system and the sensor; and
    a locking ring that fits over the body and secures the body to the remote sensing system;
    wherein multiple set screws interface with the electronic sensor and the locking ring.

2. The coupling adaptor of claim 1 wherein the first end has a threaded port and the second end has a threaded port.

3. The coupling adaptor of claim 2 further comprising a machined receptacle at the first threaded port and a machined receptacle at the second threaded port.

4. The coupling adaptor of claim 3 wherein the machined receptacles include sealing rings.

5. The adaptor of claim 1 wherein the remote sensing system is a telemetry system.

6. A method of coupling a sensor with a remote sensing system comprising the steps of:
    providing a coupling having a body which extends from a first end to a second end and a hollow interior between the first end and the second end;
    fitting the coupling within a locking ring;
    receiving an electronic sensor at the first end;
    interfacing multiple set screws with the electronic sensor and the locking ring;
    receiving a remote sensing system at the second end; and
    electrically connecting the electronic sensor to the remote sensing system with a plurality of electronic wires within the body.

7. The method of claim 6 wherein the hollow interior of the body extends from a first threaded port to a second threaded port.

8. The method of claim 7 further comprising the step of passing the electronic wiring through the hollow interior of the body to electrically connect the electronic sensor and remote sensing system.

9. The method of claim 7 further comprising the step of providing a machined receptacle at the first threaded port and a machined receptacle at the second threaded port.

10. The method of claim 9 further comprising the step of providing sealing rings within the machined receptacles.

11. The method of claim 6 wherein the remote sensing system is a telemetry system.

\* \* \* \* \*